United States Patent [19]

Stich

[11] 3,971,972
[45] July 27, 1976

[54] TRANSISTOR INVERTER MOTOR DRIVE HAVING VOLTAGE BOOST AT LOW SPEEDS

[75] Inventor: Frederick A. Stich, Milwaukee, Wis.

[73] Assignee: Allis-Chalmers Corporation, Milwaukee, Wis.

[22] Filed: Mar. 14, 1975

[21] Appl. No.: 558,294

[52] U.S. Cl. ............................. 318/227; 318/230; 318/231; 321/54
[51] Int. Cl.² ........................................ H02P 5/40
[58] Field of Search................. 318/227, 230, 231; 321/4, 9, 54

[56] References Cited
UNITED STATES PATENTS

| | | | |
|---|---|---|---|
| 3,346,794 | 10/1967 | Stemmler | 318/227 |
| 3,387,195 | 6/1968 | Piccand et al. | 318/227 |
| 3,585,488 | 6/1971 | Gutt et al. | 318/227 UX |
| 3,611,086 | 10/1971 | Mokrytzki et al. | 318/227 |
| 3,694,718 | 9/1972 | Graf et al. | 318/227 |

Primary Examiner—Gene Z. Rubinson
Attorney, Agent, or Firm—Lee H. Kaiser

[57] ABSTRACT

A transistor inverter drive provides variable frequency and variable voltage power to an electric motor and pulse width modulates a predetermined number of harmonic-reduced constant volt/hertz pulses per cycle of motor frequency to selectively vary the motor stator voltage so that constant torque over a wide speed range can be accomplished and increases the number of constant volt/hertz PWM pulses per motor frequency cycle at low motor speeds to boost the stator voltage and thereby compensate for decrease in magnetizing current and in torque which would otherwise occur at low frequencies. Particularly, the drive has first and second oscillators for respectively deriving trains of first and second clock pulses whose frequencies vary at different rates as a function of an analog speed signal; a frequency switch which selects the higher frequency train of clock pulses; a volt/hertz integrator which derives ramp pulses whose leading edges are established by the pulses from the frequency switch and which vary in magnitude as a function of the time integral of the inverter bridge output voltage; a first comparator for deriving a first control pulse when each ramp signal becomes equal to a first reference voltage; a three phase generator for deriving three phase reference waves synchronized to the first clock pulses and displaced 120° and each of whose period includes a predetermined number of first clock pulses; and means for controlling the fundamental output voltages of individual phases of the inverter bridge in accordance with respective reference waves and including pulse width modulation chopping means for controlling conduction of transistors of the bridge inverter by variable width PWM pulses whose leading edges are at the output pulses from the frequency switch and whose trailing edges are at the first control pulses, whereby the number of PWM pulses in each fundamental voltage cycle is controlled by the higher frequency pulse train and provides a boost in motor terminal voltage at low motor speeds.

32 Claims, 9 Drawing Figures

VOLTAGE BOOST CIRCUIT

Fig.6

VOLT-SECOND CIRCUIT

TRANSISTOR INVERTER MOTOR DRIVE HAVING VOLTAGE BOOST AT LOW SPEEDS

This invention relates to static electric inverters and in particular to transistor bridge inverter drives of the pulse width modulation (PWM) type for driving an electrical motor.

BACKGROUND OF THE INVENTION

A PWM tranistor bridge inverter drive is disclosed in my copending U.S. application Ser. No. 558,497 filed Mar. 14, 1975, entitled Transistor Bridge Inverter Motor Drive Having Reduced Harmonics and having the same assignee as this invention, which controls frequency and magnitude of stator voltage applied to an induction motor so as to maintain constant flux in the motor over a wide speed range and to substantially reduce harmonics in the current supplied to the motor. The inverter drive disclosed in my copending application controls the voltage-to-frequency (volt/hertz) ratio so as to maintain constant flux in the motor and can be adjusted so that motor output torque is constant over the entire speed range or can alternatively be adjusted so that the motor provides substantially constant rated torque below motor base speed and rated horsepower above base speed. The inverter drive of my copending application integrates the output voltage of the bridge inverter with respect to time over a fixed fraction of a cycle and compares the integral to a fixed level to effect constant flux in the motor and also has adjustable means to selectively vary the volt/hertz ratio and thus regulate the slope of the motor terminal voltage versus frequency characteristic.

The inverter drive disclosed in my copending application maintains the volt/hertz ratio constant and thus should theoretically maintain the magnetic flux (whose magnitude is proportional to the rate of change of voltage) in the motor constant over the entire speed range. However, the magnetic flux in a motor decreases at low motor speeds even though the volt/hertz ratio remains constant. The effective resistance drop in a motor is substantially constant in magnitude but is so much lower than the leakage reactance drop at speeds above motor base speed that it can be considered negligible. However, at low motor speeds the resistance voltage drop across the copper approaches the magnitude of the reactance voltage drop across the magnetizing inductance of the stator winding, thereby decreasing the magnitude of magnetizing current (and the magnetic flux density which is aproximately proportional to ampere turns, neglecting saturation) at low frequencies.

OBJECTS OF THE INVENTION

It is an object of the invention to provide an improved transistor bridge inverter drive for an electric motor which provides constant volts per hertz and can be adjusted to boost stator voltage at low motor speeds.

It is a further object of this invention to provide such an improved transistor bridge inverter drive for an induction motor which is adjustable to selectively vary the slope of the low motor speed portion of the motor terminal voltage versus frequency characteristic and thus provide a voltage boost and is also selectively adjustable to vary the predetermined motor speed below which voltage boost occurs.

Another object is to provide an improved transistor bridge inverter device for an electric motor which increases the number of constant volt/hertz PWM pulses per cycle of fundamental voltage at low motor speeds to thereby provide a voltage boost.

DESCRIPTION OF THE DRAWINGS

These and other objects and advantages of the invention will be more readily apparent from the following detailed description when considered in conjunction with the accompanying drawings wherein.

SUMMARY OF THE INVENTION

A transistor inverter drive in accordance with the invention provides variable frequency and variable voltage to an electric motor and pulse width modulates a predermined number of harmonic-reduced, constant volt/hertz pulses per cycle of motor frequency to selectively vary motor terminal voltage so that constant torque can be effected over a wide speed range and increases the number of constant volt/hertz PWM pulses per motor frequency cycle at low motor speeds to provide a boost in motor terminal-voltage and thereby compensate for decrease in magnetic flux which would otherwise occur at low frequencies.

The preferred embodiment of bridge inverter drive has first and second oscillators which derive trains of first and second clock pulses that vary at different rates in proportion to an analog speed signal; a frequency switch which selects the higher frequency train of pulses; a three-phase generator which derives three-phase reference waves displaced 120° each of whose period includes a predetermined number of first clock pulses; a volt/hertz integrator which derives ramp signals whose leading edges are of the output pulses from the frequency switch and which vary in magnitude as the time integral of the inverter output voltage; a comparator for deriving a control pulse when each ramp signal reaches a reference voltage; and means for controlling the fundamental output voltages of individual phases of the inverter bridge in accordance with respective reference waves and including pulse width modulation chopping means for controlling conduction of transistors of the bridge inverter by variable width PWM pulses whose leading edges are at the output pulses from the frequency switch and whose trailing edges are at the control pulses, thereby increasing the number of constant volt/hertz PWM pulses in each fundamental voltage period at lower motor speeds and providing a voltage boost in the motor terminal voltage versus frequency characteristic.

DETAILED DESCRIPTION

Figure 2A:
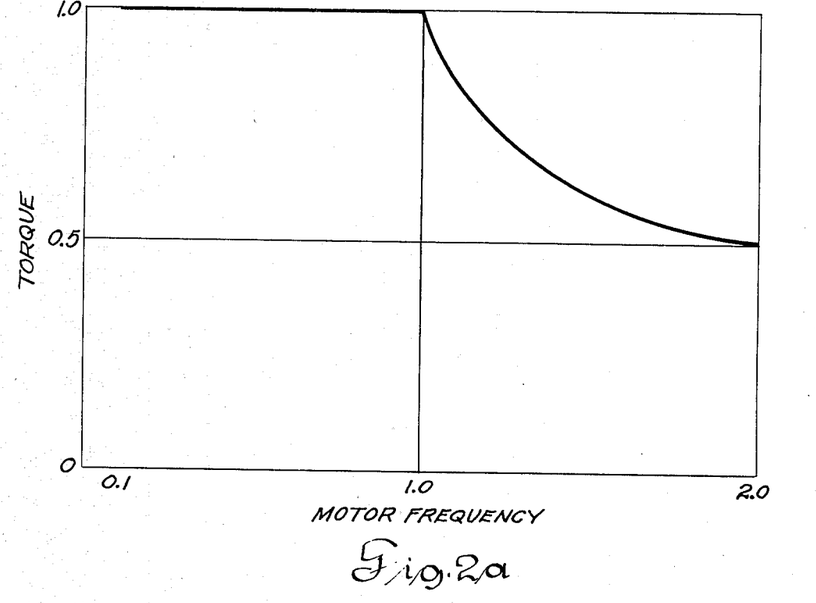
FIG. 2a illustrates the output characteristic of the inverter drive shown in FIG. 1 when adjusted to drive the motor with constant rated torque below motor base speed and rated horsepower above base speed.

The inverter motor drive of my aforementioned copending application Ser. No. 558,497 can control the stator voltage to frequency (volt/hertz) ratio so as to maintain substantially constant flux in the motor and thus provide substantially constant torque over a wide speed range as shown, for example, by the linear, constant torque, motor terminal voltage versus frequency characteristic EF in FIG. 2b. It can also be adjusted to change the volt/second ratio and thereby vary the slope of the terminal voltage versus frequency characteristic to that shown as GKHF wherein approximately constant torque is obtained from a low motor speed (such as point K) to motor base speed (as shown in FIG. 2a) and rated horsepower is obtained above base speed. The present invention permits the slope of the low frequency portion of each voltage versus frequency characteristic to be selectively varied, for example, the slope of the low speed portion GK of characteristic GKHF may be selectively adjusted to G'K or to G''K shown in dotted lines to provide a voltage boost which compensates for decrease in magnetizing current and in motor torque which would otherwise occur at low motor frequencies. The present invention also permits selection of the "breakpoint" frequency, such as that at point K, below which voltage boost is provided.

INVERTER DRIVE OF MY COPENDING APPLICATION

Figure 1:
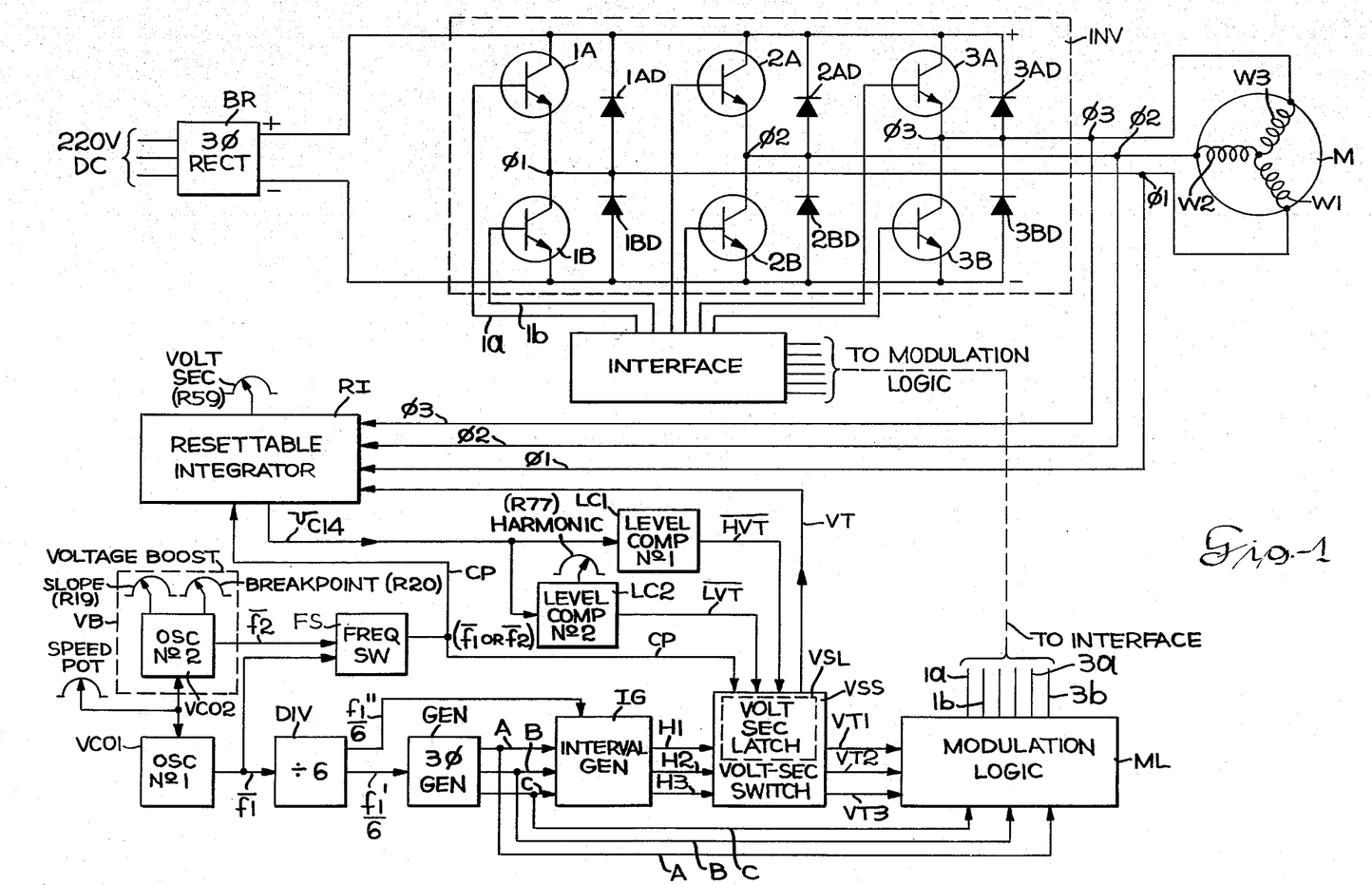
FIG. 1 is a schematic block diagram of the inverter motor drive embodying the invention.

The schematic block diagram of the present invention shown in FIG. 1 is generally similar to that of the inverter motor drive of my aforementioned application with the principal difference being that a second voltage controlled oscillator VCO2 and a frequency switch FS are added to provide a voltage boost (such as shown by curve portion G'K) at low motor speeds. In the transistor bridge inverter drive disclosed in my copending application, power from a three-phase A.C. source may be rectified in a full wave rectifier BR to provide 300 volts unidirectional power to a bridge inverter INV having a pair of power transistors in each phase leg connected in series between the 300 volt positive supply bus + and the zero voltage reference bus −. Phase one leg of the inverter bridge may have transistors 1A and 1B connected in series with the node therebetween constituting phase one terminal $\phi_1$ and also have feedback diodes 1AD and 1BD respectively connected in inverse polarity relation with 1A and 1B. Phase two may include transistors 2A and 2B connected in series between the + and − buses, and phase three of the inverter may similarly include transistors 3A and 3B connected in series between the + and − buses. Bridge inverter INV may supply voltage of variable frequency and magnitude to a three-phase induction motor M having star connected stator windings W1, W2, W3 connected respectively to the inverter phase output terminals $\phi_1$, $\phi_2$, $\phi_3$.

Figure 3:
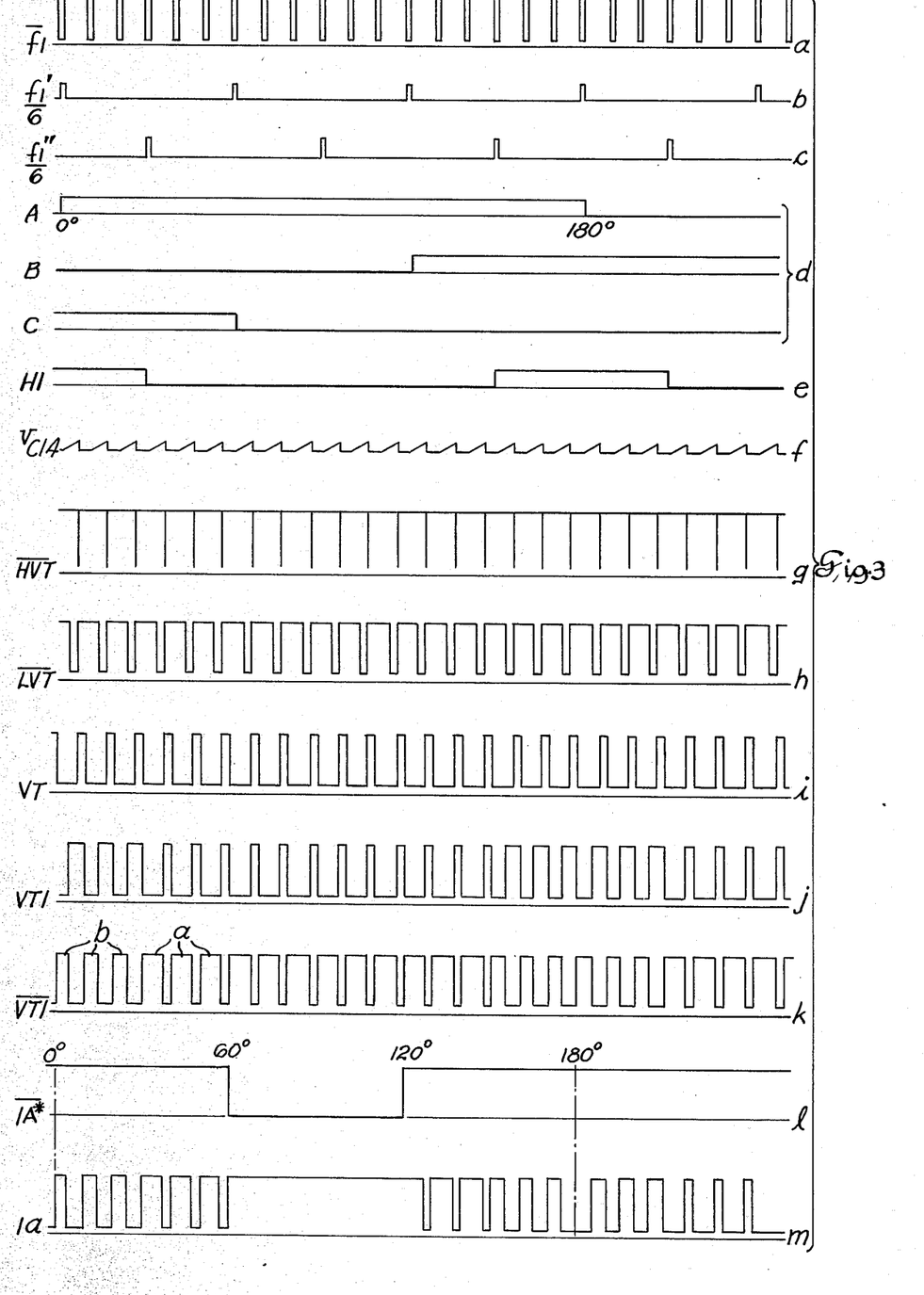
FIG. 3 illustrates pulses which exist at various points within the inverter motor drive of FIG. 1.

A speed potentiometer SPEED POT which is set by the operator to provide desired motor speed derives an analog speed signal voltage which is converted by a voltage controlled oscillator VCO1 to a variable frequency train of clock pulses $\overline{f1}$ shown in FIG. 3a whose frequency is proportional to the magnitude of the analog speed signal. The $\overline{f1}$ clock brain determines the frequency of the variable width PWM power pulses conducted by transistors 1A through 3B and applied to the motor windings W1, W2, and W3 in the invertor motor drive of my aforementioned application and also the PWM pulse period is established by the interval between $\overline{f1}$ clock pulses.

Figure 4:
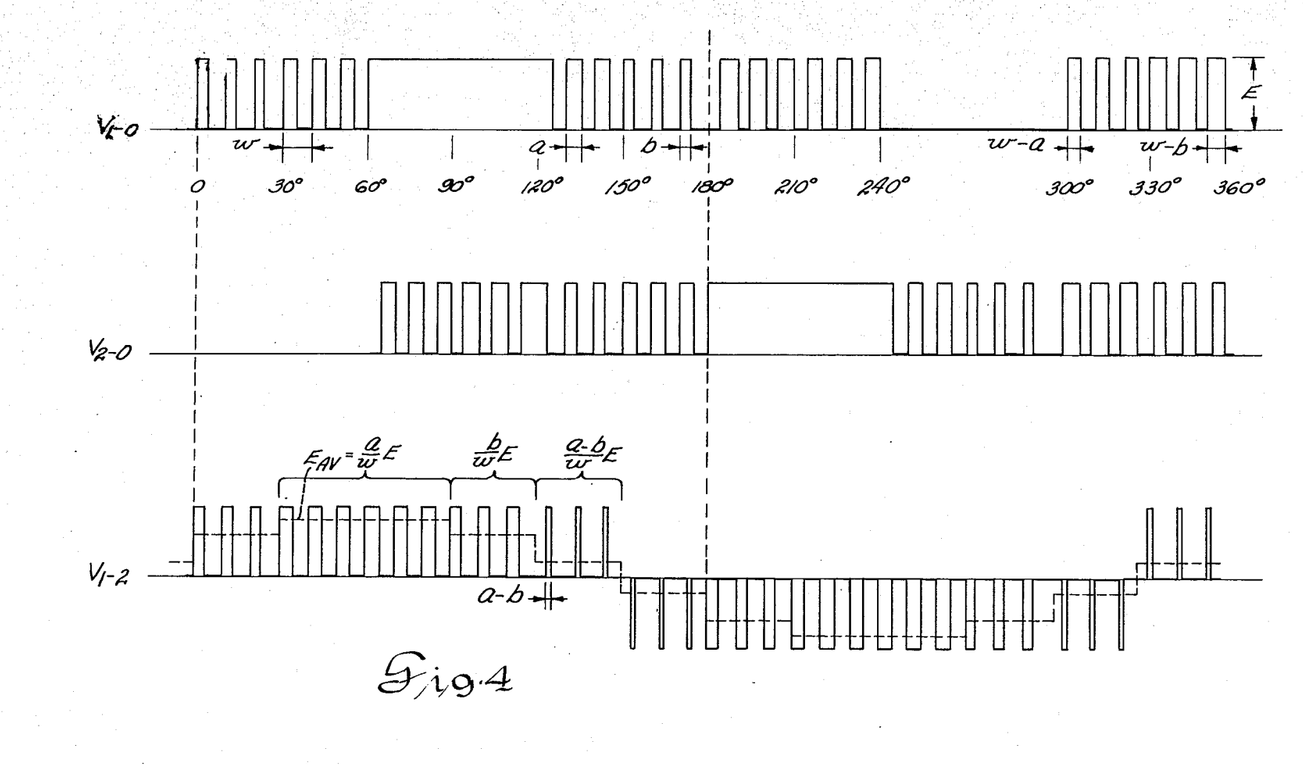
FIG. 4 illustrates typical reduced-harmonic output voltage PWM pulse patterns provided to the motor by the inverter drive of FIG. 1.

The $\overline{f1}$ pulse train is converted by a two phase, divide-by-six frequency divider DIV into two timing pulse trains $f1'/6$ (FIG. 3a) and $f1''/6$ (FIG. 3b) that are 180° phase displaced. The $f1'/6$ pulse train is the clock frequency for a three-phase generator GEN which derives a set of three-phase reference square waves A, B, C (See FIG. 3d) which are displaced 120° and establish the fundamental frequency of the line-to-reference bus inverter output voltages such as $V_{1-0}$ and $V_{2-0}$. Each full cycle of fundamental voltage from inverter INV contains 36 pulse periods w shown in FIG. 4 each which is equal to the interval between successive $f1$ clock pulses in the drive disclosed in my aforementioned application, whereas in the present invention each motor frequency fundamental voltage period may include more than 36 PWM pulse periods and thus provide a voltage boost at low motor speeds.

Figure 5:
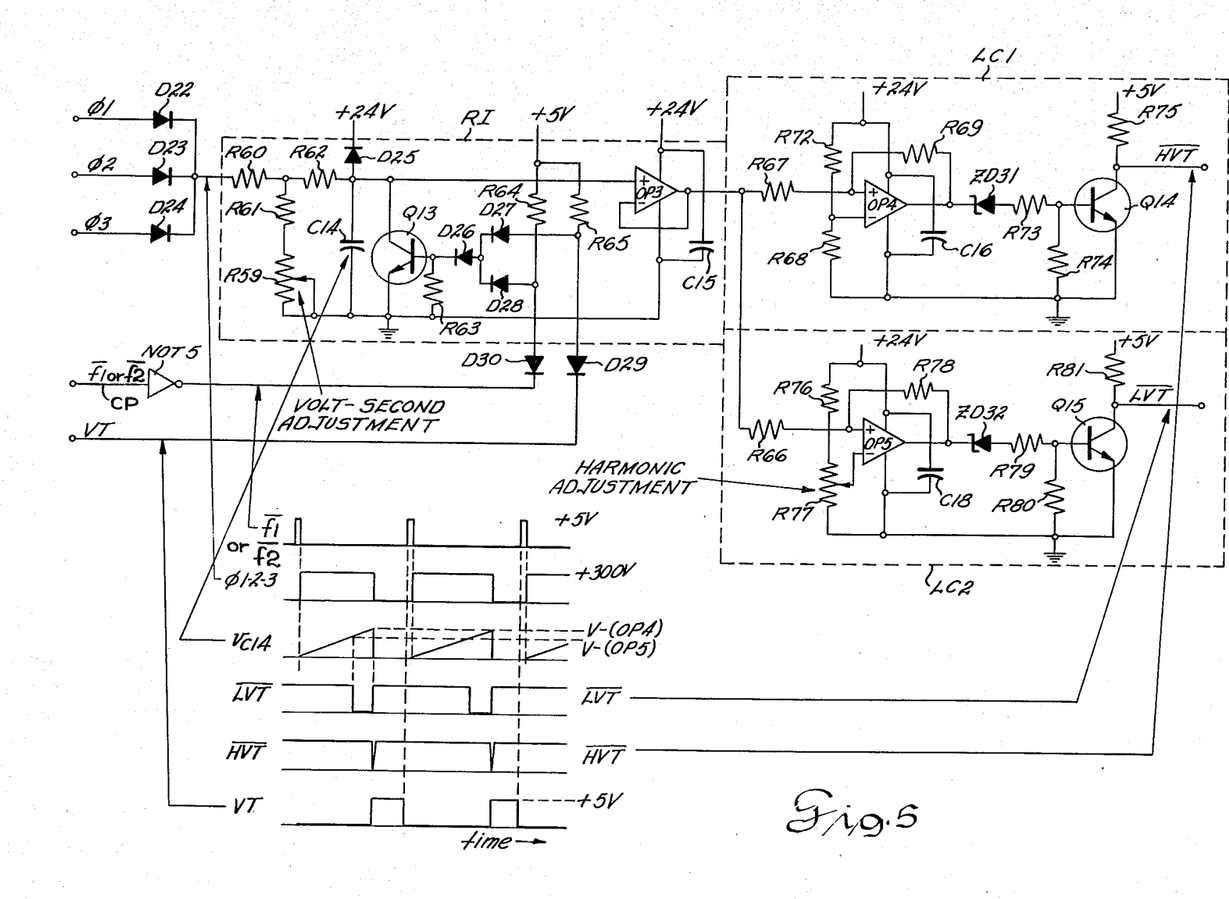
FIG. 5 shows the circuit diagram of the resettable integrator and of the first and second comparators of the inverter drive of FIG. 1.

A volt-second feedback control for providing constant flux in motor M includes a resettable integrator RI shown in FIG. 5 which senses the motor stator voltage at terminals $\phi_1$, $\phi_2$, $\phi_3$ and integrates such voltage over a fixed fraction of a cycle. The motor terminal voltage signals at $\phi_1$, $\phi_2$, $\phi_3$ are coupled to an OR circuit of diodes D22, D23, D24 whose output is applied to a voltage divider comprising resistors R60 and R61 and a volt-second adjustment potentiometer R59. A resistor R62 coupled to the junction of R60, R61 and a capacitor C14 form an integrator which derives ramp signals $v_{c14}$ shown in FIGS. 3d and 5. The ramp pulses $v_{c14}$ increase in magnitude as a function of the time integral of the inverter output voltage and are coupled through a follower operational amplifier OP3 to a first level comparator LC1 wherein they are applied to the noninverting input of an operational amplifier OP4 which has a first reference voltage applied to its inverting input. When ramp signal $v_{c14}$ becomes equal to the first reference voltage, comparator LC1 generates a first control pulse $\overline{HVT}$ (shown in FIGS. 3g and 5) which triggers a volt-second latch VSL. When volt-second latch VSL is triggered, it initiates a longer pulse VT (shown in FIGS. 3i and 5) which begins at pulse $\overline{HVT}$ and is terminated by the succeeding $\overline{f1}$ or $\overline{f2}$ clock pulse. Pulse VT is fed back to integrator RI to reset it and thereby terminate ramp pulse $v_{c14}$ and hold it reset until the succeeding $\overline{f1}$ or $\overline{f2}$ clock pulse. Pulse VT is also applied to a volt-second switch VSS where it establishes the a width of the PWM chopping pulses (see FIG. 4) which accomplish substantially constant volt-second ratio of stator voltage applied to motor M. Power is applied to motor M beginning at the leading edge of each a width PWM pulse (whose leading edge is synchronized to an $\overline{f1}$ or $\overline{f2}$ clock pulse) and continues until the succeeding first control pulse $\overline{HVT}$ which terminates the PWM pulse.

Figure 2B:
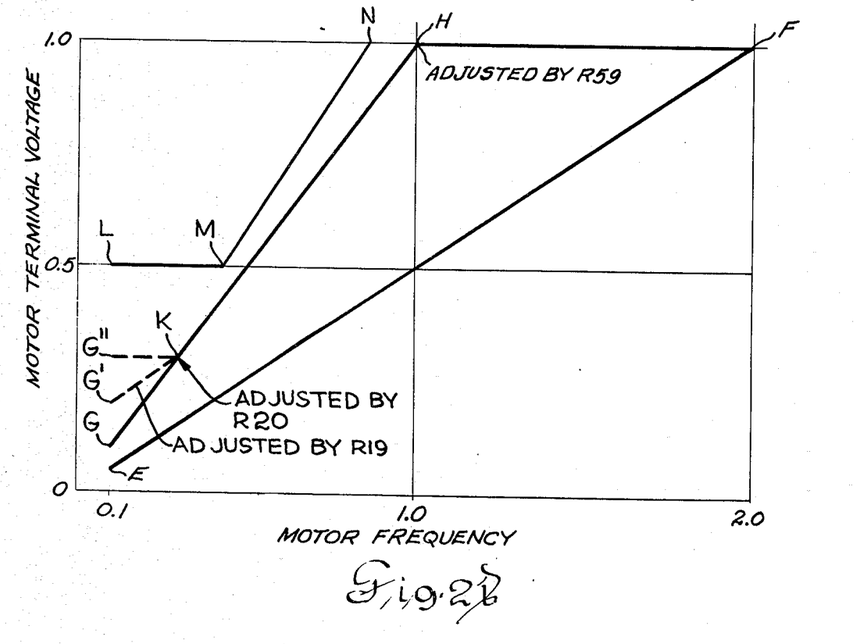
FIG. 2b illustrates different terminal voltage versus frequency charcteristics to which the inverter drive shown in FIG. 1 can be adjusted as well as different slopes to which the low motor speed portion of the characteristics can be selectively adjusted to provide different amounts of voltage boost.

VOLT-SEC potentiometer R59 permits regulation of the slope of the ramp signals $v_{c14}$ and thus adjusts the magnetic flux level in the motor M and the slope of the motor terminal voltage versus frequency characteristic output from bridge inverter INV, for example, the slope of the constant torque characteristic EF shown in FIG. 2B wherein the torque is approximately constant from a low speed up to 120 Hz. VOLT-SEC potentiometer R59 also permits adjustment of the bridge inverter drive of my copending application to provide the characteristic GKHF wherein torque is approximately constant along the portion KH over a speed range from a low speed up to 60 Hz and the motor M provides constant horsepower above base speed 1.0.

The ramp signals $v_{c14}$ from integrator RI are also applied to the noninverting input of an operation amplifier OP5 of second level comparator LC2 to obtain reduction in fifth and seventh harmonics in the current supplied to motor M. When the integrated voltage pulses $v_{c14}$ reach the level of a second reference voltage which is applied to the inverting input of operational amplifier OP5, second comparator LC2 initiates a second control pulse $\overline{LVT}$ (shown in FIGS. 3h and 5) which is coupled to the volt-second switch VSS and establishes the b width of PWM pulses (see FIG. 4) in the inverter output voltages such as $V_{1-0}$ and $V_{2-0}$. A HARMONIC adjustment potentiometer R77 permits setting of the desired percent reduction in fifth and seventh harmonics by varying the magnitude of the second reference voltage to thereby regulate the width of the b width PWM pulses relative to that of the a width PWM pulses (which controls the steps in the twelve-step inverter output voltages).

The $f1''/6$ timing pulse train from frequency divider DIV is coupled to a sixty degree interval generator IG which also receives the three-phase references waves A, B, C from the three-phase generator GEN and derives square wave pulses H1 (see FIG. 3e) H2, H3 of 60° duration which determines the steps in the corresponding twelve-step, phase to ground inverter output voltages $V_{1-0}$, $V_{2-0}$, $V_{3-0}$ from inverter INV. The H1, H2, H3 step-controlling pulses correspond respectively to the A, B, C reference waves which establish the fundamental output voltage frequency from phases $\phi_1$, $\phi_2$ and $\phi_3$ of bridge inverter INV. Step-controlling pulses such as H1 span 60° at the zero crossing transitions between (A and $\overline{A}$) of the corresponding phase reference wave.

The H1, H2, H3 signals are coupled to volt-second switch VSS which also receives the $\overline{LVT}$ and $\overline{HVT}$ pulses and selects the a or b width of PWM pulses in accordance with signals H1, H2, H3. The output from volt-second switch VSS comprises three trains of variable width, duty-cycle regulating pulses VT1 (see FIG. 3k), VT2, VT3 which are associated respectively with phases $\phi_1$, $\phi_2$, $\phi_3$ of inverter bridge INV. Volt-second switch VSS provides the narrow b width of pulses in the $\overline{VT1}$ pulse train (regulated by second control pulse $\overline{LVT}$) when H1 is present and provides the wider a width pulses of the $\overline{VT1}$ pulse train (regulated by first control pulse $\overline{HVT}$) when H1 is logic 0.

The three-phase reference waves A, B, C from GEN and the trains of reduced-harmonic, variable-width duty cycle regulating pulses VT1, VT2, VT3 from volt-second switch VSS are combined in a modulation logic current ML to form three-phase pulse patterns 1a (see FIG. 3m), 2a, 3a which respectively control chopping of current by transistors 1A, 2A and 3A of bridge inverter INV and also form three-pulse patterns 1b, 2b, 3b which are the complements of 1a, 2a, 3a and control chopping of motor current by transistors 1B, 2B, 3B respectively. During the 180° reference wave positive half cycle A, the pulse pattern 1a for phase one of the inverter follows the complement $\overline{VT1}$ of the corresponding duty cycle regulating pulses, and during the 180° negative half cycle $\overline{A}$ the pulse pattern 1a follows the corresponding duty cycle regulating pulse pattern VT1. The portion of modulation logic ML for phase 1 of inverter INV also derives 60° width pulses $\overline{1A^*}$ (see FIG. 3l) and $\overline{1B^*}$ and superimposes them on the VT1 train of duty cycle regulating pulses so that the pulse train 1a which controls chopping by transistor 1A follows $\overline{VT1}$ during the positive half cycle A of the corresponding reference wave with a 60° maximum duty cycle pulse at the middle thereof (see FIG. 3m) and follows VT1 during the negative half cycle $\overline{A}$ with pulses deleted for 60° during the midportion thereof.

DETAILED DESCRIPTION OF PRESENT INVENTION

Figure 6:
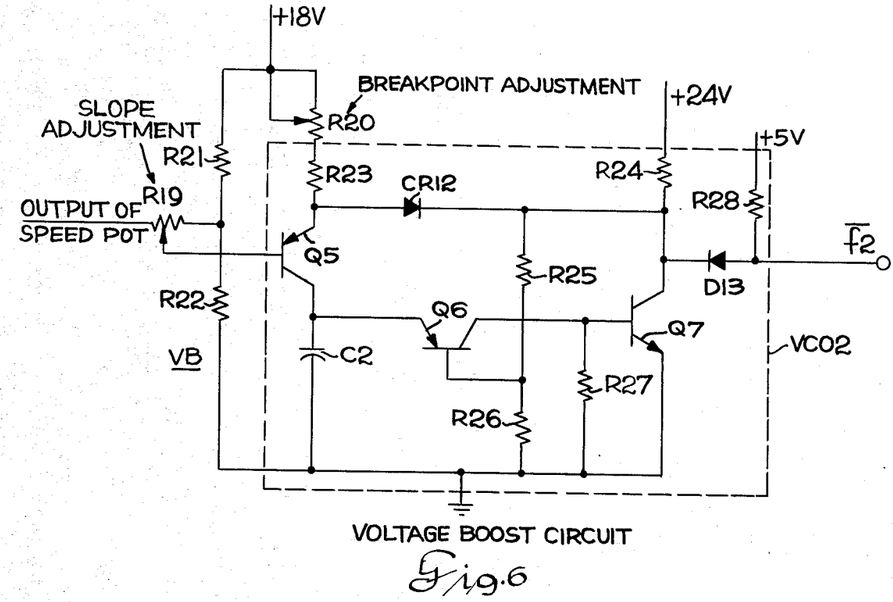
FIG. 6 shows the circuit diagram of the voltage boost circuit including the second voltage controlled oscillator of the inverter drive of FIG. 1.

The inverter motor drive of the present invention schematically illustrated in FIG. 1 provides a voltage boost at low motor speeds to compensate for decrease in magnetizing current and in motor torque that would occur at low frequencies in the absence of such voltage boost. The analog speed signal voltage set on the SPEED POT potentiometer is applied to a voltage boost circuit VB shown in FIG. 6 which includes a second voltage controlled oscillator VCO2 that is similar in function to oscillator VCO1 and generates a train of clock pulses $\overline{f2}$ whose frequency varies as a different function of the speed signal than clock pulse train $\overline{f1}$.

VOLTAGE BOOST CIRCUIT

The general purpose of the voltage boost circuit VB is to apply extra PWM pulses to motor M at low speeds by substituting $f2$ for $f1$. The inverter drive of my copending application may apply a maximum of 36 PWM pulses per fundamental voltage cycle, whereas the inverter drive of the present invention may apply more than 36 pulses per fundamental cycle to motor M and each PWM pulse still has the same volt-second level. A frequency switch FS receives both the $f1$ and $f2$ clock pulse trains and chooses the higher frequency train as the PWM pulse rate.

The analog speed signal from the SPEED POT potentiometer is coupled through a slope adjustment potentiometer R19 to the base of transistor Q5 of relaxation oscillator VCO2 which converts the speed signal to a pulse train $\overline{f2}$. Transistor Q5 converts the speed signal voltage to a constant charging current flowing into a timing capacitor C2 through breakpoint adjustment potentiometer R20 and collector resistance R23. Breakpoint adjustment potentiometer R20 establishes the predetermined motor speed below which a voltage boost is applied to motor M (such as illustrated at point K on characteristic GKHF in FIG. 2), and such predetermined motor speed is established by the frequency at which the voltage versus frequency characteristics of oscillators VCO1 and VCO2 cross. Variations in magnitude of the speed signal voltage changes the charging rate of timing capacitor C2. The voltage across timing capacitor C2 is coupled to the emitter of a transistor Q6 whose base is referenced to a voltage divider R24, R25, R26 so that Q6 functions as a differential switch. When the voltage across timing capacitor C2 reaches a predetermined magnitude which forward biases Q6, it conducts and develops a voltage drop across resistance R27 which forward biases transistor Q7 and turns it on. Conduction by Q7 lowers the reference voltage at the base of Q6 so that Q6 and Q7 are latched into conduction by positive feedback. Capacitor C2 is discharged through conducting transistor Q7 to a level which is insufficient to forward bias Q6 and Q7, whereupon oscillator VCO2 returns to its quiescent state. Conduction by Q7 pulls its collector to ground and generates a negative $\overline{f2}$ clock pulse through diode D13 on the $\overline{f2}$ lead to the frequency switch.

The frequency switch FS regulates whether clock pulses $\overline{f1}$ or $\overline{f2}$ determine the rate of PWM pulses applied to motor M. Frequency switch FS selects the higher frequency train $f1$ or $f2$, and since oscillators VCO1 and VCO2 vary in frequency with speed signal voltage at a predetermined but different rate, a crossover point, or breakpoint (such as point K), exists at which the frequencies of $f1$ and $f2$ are switched.

The range of possible boost of motor terminal voltage which can be set by slope adjustment potentiometer R19 is illustrated in FIG. 2. When no voltage boost is provided, the motor terminal voltage versus frequency characteristic such as GKHF passes through the origin. When maximum voltage boost is selected on R19, the low voltage portion assumes zero slope such as G''K wherein the motor terminal voltage is approximately constant up to the breakpoint frequency. One end of slope adjustment potentiometer R19 is coupled to the junction of two resistances R21 and R22 (see FIG. 6) connected in series to form a voltage divider across a voltage source +18V, and potentiometer R19 can be adjusted so that the base of transistor Q5 receives the unattenuated speed signal (when the slider of R19 is to the extreme left position) or an approximately fixed voltage from divider R21, R22 (when the slider is at the extreme right position). The low frequency portion (such as GK) of terminal voltage versus frequency characteristic (such as GKHF) shown in FIG. 2b has the highest slope so that the characteristic passes through the origin and no voltage boost is provided when oscillator VCO2 receives the unattenuated speed signal. The amount of voltage boost is progressively increased as the slider of R19 is moved to the right, and the low frequency portion of the characteristic may assume positions such as G'K and G''K shown in dotted lines. Maximum boost is provided and the characteristics assumes a horizontal, or zero slope when the slider R19 is at its extreme right position so the base of Q19 receives a fixed voltage from voltage divider R21, R22.

Adjustment of the breakpoint (such as point K) in the terminal voltage versus frequency characteristic (below which voltage boost occurs) is accomplished by breakpoint adjustment potentiometer R20 which regulates the charging current to timing capacitor C2 to thereby adjust the frequency of oscillator VCO2 (for a given magnitude of speed signal from SPEED POT). The adjustments of the slope and breakpoint potentiometers are interdependent. The slope setting potentiometer R19 should be adjusted first by comparing the change in frequency of clock pulses $f2$ with the change of frequency of pulses $f1$, and the breakpoint can then be adjusted at R20 by making $f2$ equal to $f1$ at the breakpoint frequency. Characteristic LMN illustrates the condition where volt-second potentiometer R59 is set to provide the highest slope of motor-terminal voltage versus frequency characteristic and slope adjusting potentiometer R19 is set to provide maximum voltage boost at low motor speeds.

FREQUENCY SWITCH

Figure 7:
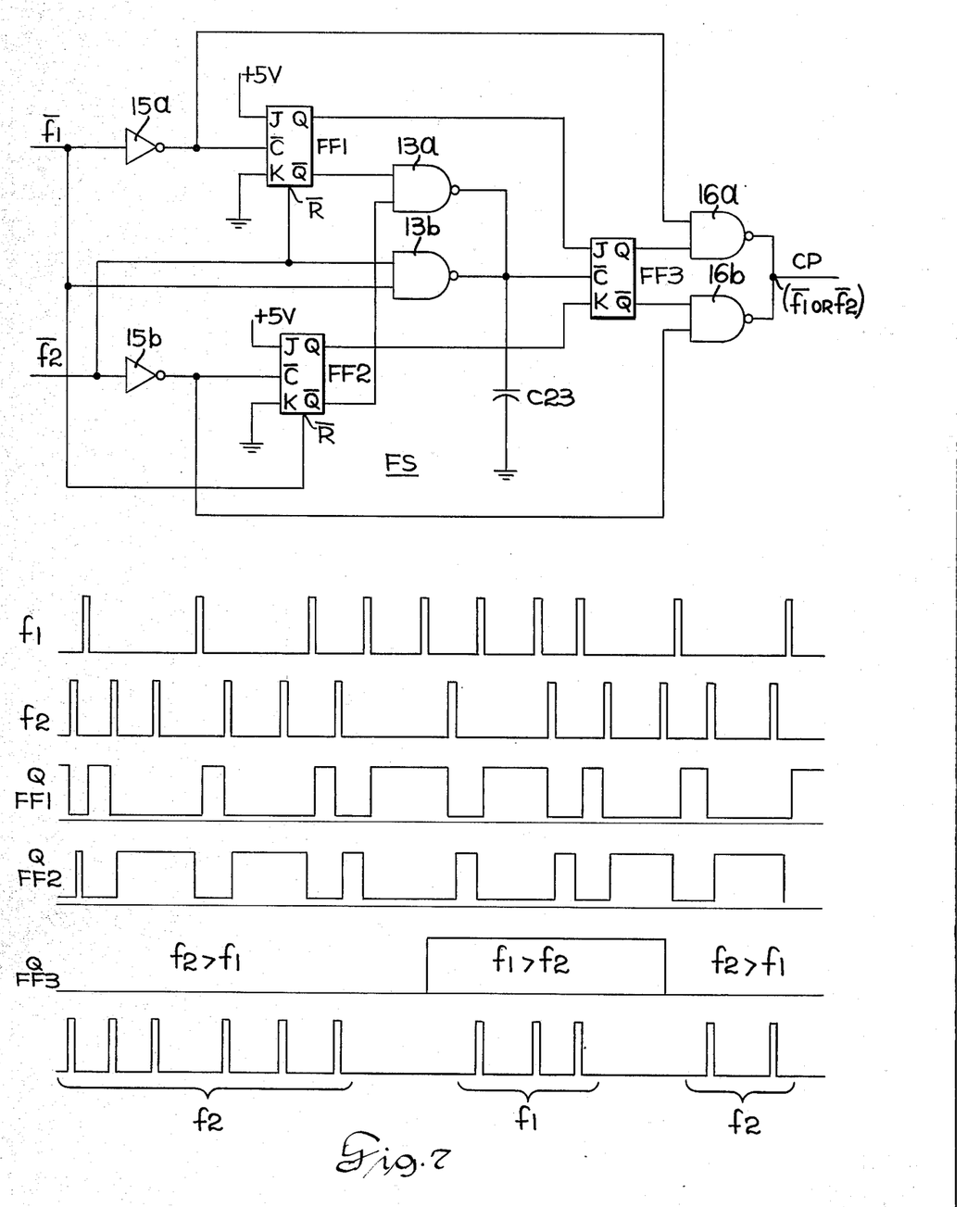
FIG. 7 shows the circuit diagram of the frequency switch of the inverter drive of FIG. 1 and pulses which appear at various points within the frequency switch.

Frequency switch FS shown in FIG. 7 determines whether the frequency of clock pulses $f1$ or $f2$ is higher and includes first and second JK flip-flops FF1 and FF2 which are respectively clocked by pulses $f1$ and $f2$ and reset by the other pulse train. Both FF1 and FF2 have logic 1 and logic 0 voltages applied to their J and K inputs respectively. Consequently, the Q output of FF1 goes to logic 1 on the trailing edge of each $f1$ pulse and goes to logic 0 on the leading edge of the succeeding $f2$ pulse. Similarly, the Q output of FF2 goes to logic 1 on the trailing edge of each $f2$ pulse and goes to logic 0 on the leading edge of the succeeding $f1$ pulse. The Q outputs of FF1 and FF2 are respectively applied to the J and K inputs of a JK flip-flop FF3. The $\overline{f1}$ and $\overline{f2}$ pulses are inputs to a NAND gate 13b whose output is coupled to the clock input of FF3 so that FF3 can be clocked by either an $\overline{f1}$ or $\overline{f2}$ pulse. The $\overline{Q}$ outputs of FF1 and FF2 are inputs to a NAND gate 13a whose output is also coupled to the clock input of FF3 so that the output of 13a goes to logic 0 and prevents clocking of FF1 when the outputs of FF1 and FF2 are both logic 1, which occurs during transistion between states.

FIG. 7 illustrates successive situations wherein the $f2$ pulse rate begins at a higher frequency than $f1$, then decreases to a lower frequency than $f1$, and then returns to a higher frequency than $f1$. Inasmuch as the Q output of FF2 goes to logic 1 on the trailing edge of each $f2$ pulse and is only returned to logic 0 at the succeeding $f1$ pulse, the situation whereon the frequency of $f2$ is greater than $f1$ results in simultaneous logic 1 signals on the clock and K inputs of FF3 so that its Q output is logic 0 and its $\overline{Q}$ output is logic 1. The Q output of FF3 is an input to an NAND gate 16a which also receives the $f1$ clock pulses as an input, and the $\overline{Q}$ output of FF3 is an input to a NAND gate 16b which also receives the $f2$ clock pulses as an input. The output of gates 16a and 16b are commonded and connected to a CP lead to the voltage second switch VSS and also to resettable integrator RI. Consequently, when the $f2$ frequency is higher than the $f1$ frequency so logic 1 exists on the $\overline{Q}$ lead from FF3, the output of gate 16b goes to logic 0 on each $f2$ pulse so that $\overline{f2}$ pulses appear on the CP lead to the VSS switch and to integrator RI. Similarly, when $f1$ clock pulse frequency is higher than $f2$ so that logic 1 exists on the Q lead from FF3, the output of gate 16a goes to logic 0 on each $f1$ pulse and the train of $\overline{f1}$ pulses appear on the CP lead.

The clock pulses ($\overline{f1}$ or $\overline{f2}$) on the CP lead to resettable integrator RI are coupled through gate NOT 5 and diode D30 to the base of transistor Q13 and forward bias it into conduction to thereby short circuit and discharge capacitor C14 (if Q13 has not been turned on by a VT pulse).

VOLT-SECOND SWITCH

Figure 8:
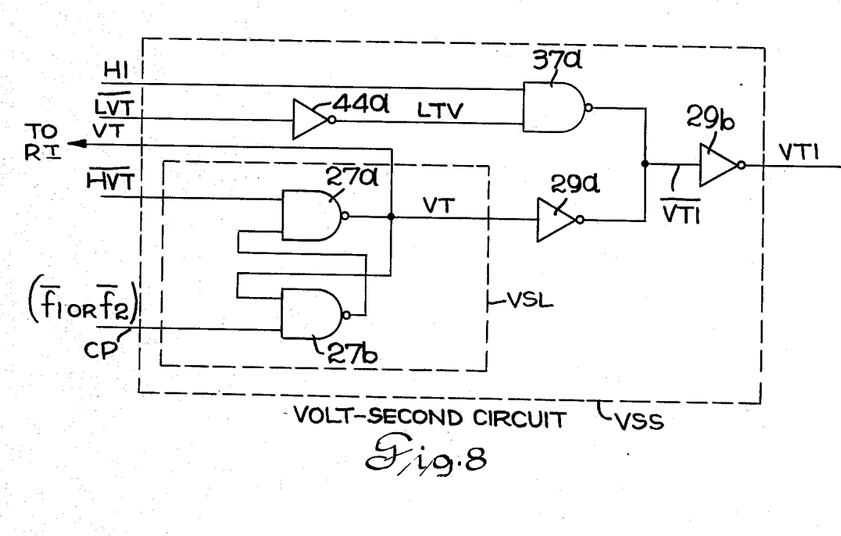
FIG. 8 shows the circuit diagram of the volt-second switch and the volt-second latch of the inverter drive of FIG. 1.

The portion of volt-second switch VSS for phase one of the inverter INV is shown in FIG. 8 and described in my aforementioned application and includes volt-second latch VSL comprising cross-connected NAND gates 27a and 27b. Each first control pulse $\overline{HVT}$ from first level comparator LC1 is an input to gate 27a and sets the latch VSL to generate the positive-going leading edge of the VT pulse at the output of 27a which is fed back to resettable integrator RI to discharge capacitor C14 and terminate the ramp signal $v_{c14}$, thus terminating each $a$ width PWM pulse (when H1 is absent) in the 1$a$ train which controls chopping by transistor 1A. The subsequent $f1$ or $f2$ pulse on the CP lead is an input to gate 27$b$ and resets latch VSL to terminate the VT pulse. When the VT pulse ceases, transistor Q13 in no longer forward biased and turns off, thus permitting capacitor C14 of the integrator RI to begin to charge and generate the succeeding ramp pulse $v_{c14}$.

The period $w$ of the PWM pulses is the interval between clock pulses $\overline{f1}$ or $\overline{f2}$ on lead CP. Clock pulses $\overline{f1}$ appear on lead CP when the frequency of $\overline{f1}$ is greater than that of $\overline{f2}$, and $\overline{f2}$ clock pulses appear on lead CP when the frequency of $\overline{f2}$ is greater than that of $\overline{f1}$.

When square wave H1 from interval generator IG is absent, the duty cycle regulating pulses of the VT1 pulse train are identical to the VT pulses which begin at each $\overline{HVT}$ pulse and terminate at the subsequent clock ($\overline{f1}$ or $\overline{f2}$) pulse on lead CP. Since transistor 1A is controlled by pattern 1$a$ which follows the complement $\overline{VT1}$ during the positive half cycle of the A reference wave, the PWM pulses conducted by 1A are of a width ($w$–VT), where $w$ is the pulse period. Pulse period $w$ is variable and depends upon whether $\overline{f1}$ or $\overline{f2}$ pulses appear on the CP lead to volt-second latch VSL to integrator RI. The reference waves A, B, C (see FIG. 3$d$) which determine the fundamental component of the inverter phase output voltages are controlled by clock pulses $f1$, but the number of PWM pulses in each cycle of fundamental voltage is dependent upon whether the frequency of $\overline{f1}$ or $\overline{f2}$ pulses is higher. The output frequencies of oscillators VCO1 and VCO2 both vary in proportion to the magnitude of the speed signal from SPEED POT potentiometer but vary at different rates so that the frequencies of $f1$ and $f2$ pulses cross at the breakpoint, and the frequency of clock pulses $\overline{f2}$ is higher than that of clock pulses $\overline{f1}$ at frequencies below the breakpoint. Further, the difference in frequency between $\overline{f1}$ and $\overline{f2}$ clock pulses increases as motor speed diminishes. Since the number of PWM pulse periods $w$ during each cycle of fundamental motor voltage is a function of the higher frequency pulses $\overline{f2}$ below the breakpoint while the fundamental motor voltage period remains constant, it will be appriciated that average voltage applied to motor M is boosted at low frequencies. As described hereinbefore, the low motor speed portion of each motor voltage versus frequency characteristic (such as GKHF) may be adjusted by slope setting potentiometer R19 so that it passes through the origin and has the highest slope (such as GK) when no voltage boost is provided, or may be selectively adjusted by R19 so that it assumes different slopes, such as shown at G'K or G''K, wherein different amounts of voltage boost are provided. Further, breakpoint adjusting potentiometer R20 establishes the motor speed (such as that corresponding to point K) below which voltage boost occurs because the $\overline{f2}$ clock pulse frequency is higher than the $\overline{f1}$ clock pulse frequency.

Volt-second switch VSS also receives the H1 and $\overline{LVT}$ pulses as inputs, and when H1 pulse is present the output pulse on the VT1 lead begins at the $\overline{LVT}$ pulse and terminates at the succeeding clock pulse ($f1$ or $f2$) on the CP lead. The duty cycle regulating pulses of the VT1 train are thus of a width ($w$–$b$) as long as H1 is present. Inasmuch as transistor 1A is controlled by pulse train 1$a$ which follows the complement $\overline{VT1}$ during the positive half cycle of the A reference wave, the pulses of the 1$a$ train from modulation logic ML are of $b$ width during the first 30° and during the last 30° of the A wave positive half cycle since H1 spans the transitions between the A and $\overline{A}$ half cycles, thereby resulting in the twelve step, reduced-harmonic, average line-to-line voltages, such as $V_{1-2}$ shown in FIG. 4, being applied to the motor windings.

While only a single embodiment of my invention has been illustrated and described, many modifications and variations thereof will be readily apparent to those skilled in the art, and consequently it should be understood that I do not intend to be limited to the particular embodiment shown and described.

The embodiments of the invention in which an exclusive property or privilege is claimed are defined as follows:

1. In a three-phase bridge inverter drive for supplying variable frequency and variable magnitude voltage to an electric motor,
   integrator means for deriving constant volt/hertz pulses whose frequency is a function of an analog speed signal and which vary in width as a function of the time integral of the inverter output voltage,
   means for deriving three-phase reference waves displaced 120° apart each of which has a period which includes a predetermined number of said constant volt/hertz pulses,
   means for controlling the fundamental output voltages of individual phases of the bridge inverter in accordance with respective said three-phase reference waves and including pulse width modulating means for switching individual phases of said bridge inverter in accordance with said constant volt/hertz pulses, and
   voltage boost means for increasing the frequency of said constant volt/hertz pulses at motor speeds below a predetermined speed to thereby increase the number of constant volt/hertz PWM pulses during each cycle of motor frequency voltage and provide a boost in inverter output voltage at low frequencies.

2. In an inverter drive in accordance with claim 1 and including
   first and second oscillator means for respectively deriving trains of first and second clock pulses whose frequencies are different functions of said analog speed signal, and wherein
   said reference wave deriving means generates three-phase reference waves each of which has a period which includes a predetermined number of said first clock pulses, and
   said voltage boost means includes a frequency switch for selecting the higher frequency train of clock pulses, and wherein said integrator means derives constant volt/hertz pulses whose frequency is equal to that of the output pulses from said frequency switch.

3. In an inverter drive in accordance with claim 2 wherein said three-phase inverter bridge includes a plurality of controllable semiconductors, and said integrator means includes a resettable volt/hertz integrator for deriving ramp signals whose leading edges are at the output pulses from said frequency switch and which vary in instantaneous magnitude as a function of the time integral of the output voltage from said bridge inverter, and a first comparator for generating a first control pulse when the magnitude of each ramp signal becomes equal to a first reference voltage, and wherein said pulse width modulating means controls switching of said controllable semiconductors of said bridge inverter by variable width PWM pulses whose leading edges are established by the output pulses from said frequency switch and whose trailing edges are established by said first control pulses.

4. In an inverter drive in accordance with claim 3 wherein the frequency of said first and second clock pulses derived by said first and second oscillator means vary at different rates in proportion to the magnitude of said analog speed signal, and wherein said second oscillator means has slope adjusting means for selectively varying the rate at which the frequency of said second clock pulses vary in proportion to the magnitude of said speed signal to thereby regulate the slope of the motor terminal voltage versus frequency characteristic at low motor speeds.

5. In an inverter drive in accordance with claim 3 wherein said resettable volt/hertz integrator includes volt-second means for selectively adjusting the slope of said ramp signals to thereby regulate both the volt/hertz level of said constant volt/hertz pulses and the magnetic flux density in said electric motor.

6. In a bridge inverter drive in accordance with claim 1 wherein said voltage boost means increases the frequency of said constant volt/hertz pulses in proportion to the deviation of said motor speed from said predetermined speed.

7. In a bridge inverter drive in accordance with claim 6 wherein said voltage boost means is adjustable to vary the rate at which the frequency of said constant volt/hertz pulses increases in proportion to said deviation of said motor speed from said predetermined speed.

8. In an inverter drive in accordance with claim 4 wherein said second oscillator means has a timing capacitor and derives a first clock pulse when said timing capacitor is charged to a predetermined voltage, said slope adjusting means includes a variable resistance to which said analog speed signal is applied and means controlled by the voltage developed across said slope adjusting variable resistance for regulating the magnitude of charging current flowing into said timing capacitor.

9. In an inverter drive in accordance with claim 8 wherein the frequency versus speed signal voltage characteristics of said first and second oscillator means cross at a breakpoint, and including breakpoint adjusting means for selectively varying the charging current flowing into said timing capacitor independent of said slope adjusting variable resistance to thereby regulate both the frequency at which said characteristics cross and the predetermined motor speed below which voltage boost occurs.

10. In an inverter drive in accordance with claim 3 and including a second comparator for deriving a second control pulse when the voltage of said ramp signal becomes equal to a second reference voltage which is of smaller magnitude than said first reference voltage, and wherein said pulse width modulating means controls the switching of said controllable semiconductors of said bridge inverter adjacent the leading and trailing edges of each half cycle of said reference waves by variable width PWM pulses whose trailing edges are established by said second control pulses, whereby harmonics are reduced in the current supplied by said bridge inverter to said motor.

11. In a bridge inverter drive in accordance with claim 1 wherein said bridge inverter has a plurality of phase legs each of which includes controllable semiconductor means, and said integrator means includes means for deriving three trains of said constant volt/hertz pulses each of which is associated with one of said phase legs and the associated phase reference wave, and said pulse width modulating means controls switching of said controllable semiconductor means of each said phase leg as a function of the corresponding train of constant volt/hertz pulses.

12. In a bridge inverter drive in accordance with claim 11 wherein each of said bridge inverter phase legs includes first and second controllable semiconductors connected in series across a d.c. power source, and said pulse width modulating means switches said first and second controllable semiconductors in each said phase leg in opposition and controls each second controllable semiconductor during the negative half cycle of the corresponding phase reference wave in accordance with the associated said train of constant volt/hertz pulses and controls said first controllable semiconductor during the positive half cycle of the corresponding phase wave in accordance with said associated train of constant volt/hertz pulses.

13. In a bridge inverter drive in accordance with claim 12 and including first and second voltage controlled oscillators for respectively deriving first and second clock pulses whose frequencies are different functions of said analog speed signal, and wherein said reference wave deriving means generates three-phase reference waves whose edges are synchronized to each first clock pulses and each of which has a period which includes a predetermined number of said first clock pulses, said voltage boost means includes a frequency switch for selecting the higher frequency train of clock pulses, and wherein said integrator means derives constant volt/hertz pulses whose frequency is equal to that of the output pulses from said frequency switch.

14. In a bridge inverter in accordance with claim 13 wherein said integrator means includes
a resettable volt/hertz integrator for deriving ramp signals whose leading edges are at the output pulses from said frequency switch and whose instantaneous magnitude varies as a function of the time integral of the output voltage from said bridge inverter, and
a first comparator for generating a first control pulse when the magnitude of each said ramp signal becomes equal to a first reference voltage, and wherein said means for deriving three trains of constant volt/hertz pulses generates duty cycle regulating pulses whose leading edges are established by the output pulses from said frequency switch and whose trailing edges are established by said first control pulses.

15. In a bridge inverter in accordance with claim 14 wherein said resettable volt/hertz integrator includes volt-second adjusting means for selectively varying the slope of said ramp signals, and wherein one of said oscillators has slope setting means for selectively adjusting the rate at which the frequency of its output clock pulses vary in proportion to the magnitude of said speed signal to thereby regulate the slope of the low motor speed portion of the inverter output voltage versus frequency characteristic.

16. In a drive including a three-phase bridge inverter having a plurality of semiconductor switches for supplying variable frequency and variable magnitude voltage to an electric motor, first and second oscillator means for respectively deriving trains of first and second clock pulses whose frequencies are different functions of an analog speed signal, a frequency switch for selecting the higher frequency train of clock pulses, a resettable volt/hertz integrator for deriving ramp signals which are synchronized to the output pulses from said frequency switch and which vary in instantaneous magnitude as a function of the time integral of the output voltage from said inverter, a first comparator for deriving a first control pulse when the voltage of said ramp signal becomes equal to a first reference voltage, means for deriving three-phase reference waves displaced 120° apart each of which has a period which includes a predetermined number of said first clock pulses, means for controlling the fundamental output voltages of individual phases of said inverter bridge in accordance with respective three-phase reference waves and including pulse width modulating means for controlling the switching of said semiconductor switches of said bridge inverter by variable width PWM pulses whose leading edges are established by the output pulses from said frequency switch and whose trailing edges are established by said first control pulses, whereby the number of constant volt/hertz PWM pulses in each cycle of bridge inverter fundamental voltage is controlled by the higher frequency clock pulse train and provides a boost in the output voltage of said bridge inverter at low motor speeds.

17. In a drive for an electric motor in accordance with claim 16 wherein the frequency of said first and of second clock pulses derived by said first and second oscillator means vary at different rates in proportion to the magnitude of said analog speed signal, and wherein said second oscillator means has slope adjusting means for selectively varying the rate at which the frequency of said second clock pulses changes in proportion to the magnitude of said speed signal to thereby regulate the slope of the motor terminal voltage versus frequency characteristic at low motor frequencies.

18. In a drive for an electric motor in accordance with claim 17 wherein said slope adjusting means includes a variable resistance across which said analog speed signal is impressed, and said second oscillator means includes a relaxation oscillator having a timing capacitor and means controlled by the voltage developed across said slope adjusting variable resistance for regulating the magnitude of charging current flowing into said timing capacitor.

19. In a drive for an electric motor in accordance with claim 18 wherein the frequency versus speed signal characteristics of said first and second oscillator means cross at a breakpoint, and including breakpoint adjusting means for selectively varying the charging current flowing into said timing capacitor independent of said slope adjusting variable resistance to thereby regulate the frequency at which said characteristics cross.

20. In a drive for an electric motor in accordance with claim 16 and including a second comparator for deriving a second control pulse when the voltage of said ramp signal becomes equal to a second reference voltage which is of smaller magnitude than said first reference voltage, and wherein said pulse width modulating means controls the switching of said semiconductor switches of said bridge inverter adjacent the leading and trailing edges of each half cycle of said reference waves by variable width PWM pulses whose trailing edges are established by said second control pulses, whereby fifth and seventh harmonics are reduced in the currents supplied by said bridge inverter to said motor.

21. In a drive for an electric motor in accordance with claim 20 and including harmonic adjusting means for selectively varying the magnitude of said second reference voltage to thereby regulate the width of the PWM pulses whose trailing edges are established by said second control pulses and thus control the percent of harmonic reduction.

22. In a drive for an electric motor in accordance with claim 10 and including volt-second adjusting means for selectively varying the slope of said ramp signals to thereby regulate the volt-second level of said PWM pulses and the slope of the terminal voltage versus frequency characteristic of the bridge inverter output voltage.

23. In a variable frequency and variable voltage drive for an electric motor including a three-phase bridge inverter having a plurality of semiconductor switches, a first oscillator for deriving a train of first clock pulses whose frequency is a function of an analog speed signal, a resettable volt/hertz integrator for deriving ramp pulses which vary in instantaneous magnitude as a function of the integral of the output voltage from said bridge inverter with respect to time, three-phase generator means for deriving three-phase reference waves displaced 120° apart each of which has a period equal to the time interval required to generate a predetermined number of said first clock pulses, a first comparator for deriving a first control pulse when the voltage of each said ramp pulse becomes equal to a first reference voltage, and means for controlling the fundamental output voltages of individual phases of said inverter bridge in accordance with said three-phase reference waves, the improvement comprising
  a second oscillator for deriving a train of second clock pulses whose frequency is a different function of said analog speed signal than said first oscillator,
  a frequency switch receiving said trains of first and second clock pulses as inputs and providing the higher frequency train as an output,
  the leading edges of said ramp pulses derived by said volt/hertz integrator being established by the output pulses from said frequency switch, and
  pulse width modulating means for controlling said semiconductor switches of said bridge inverter by variable width pulses whose leading edges are established by the output pulses from said frequency switch and whose trailing edges are established by said first control pulses.

24. In a drive for an electric motor in accordance with claim 23 and including
  a second comparator for deriving a second control pulse when the voltage of each said ramp pulse becomes equal to a second reference voltage which is of lower magnitude than said first control pulse, and wherein said pulse width modulation means terminates said variable width pulses which occur adjacent the leading edge and adjacent the trailing edge of the positive half cycle of the corresponding reference wave as a function of said second control pulses to thereby decrease harmonics in current supplied by said bridge inverter to said motor.

25. In a drive for an electric motor in accordance with claim 23 wherein the frequency of said first and second clock pulses derived by said first and second oscillators varies at different rates in proportion to the magnitude of said analog speed signal so that their frequency versus speed signal characteristics cross at a breakpoint, and wherein said second oscillator has means for selectively varying the rate at which the frequency of said second clock pulses vary in proportion to the magnitude of said speed signal to thereby regulate the slope of the inverter output voltage versus frequency characteristic at low motor speeds.

26. In a drive for an electric motor in accordance with claim 25 wherein said second oscillator has a timing capacitor and derives a second clock pulse when said timing capacitor is charged to a predetermined voltage, and wherein said means for selectively adjusting the rate at which said second clock pulse frequency varies includes potentiometer means receiving said speed signal as an input for selectively regulating the magnitude of charging current to said timing capacitor.

27. In a variable frequency and variable voltage drive for a three-phase electric motor including a three-phase bridge inverter having a plurality of power transistors, means for deriving an analog speed signal indicative of desired motor speed, first oscillator means for providing a train of first clock pulses whose frequency is a funtion of said analog speed signal, second oscillator means for providing a train of second clock pulses whose frequency is a different function of said analog speed signal, the frequency versus speed signal voltage characteristics of said first and second oscillator means crossing at a breakpoint, a frequency switch for selecting the train of first or of second clock pulses which is higher in frequency, resettable volt/hertz integrator means for deriving ramp pulses whose leading edge is at each output pulse from said frequency switch and which varies in instantaneous magnitude as a function of the integral of the output voltage from said bridge inverter with respect to time, a first comparator for comparing said integrated volt/hertz value to a first reference voltage and for deriving a first control pulse when the magnitude of said ramp pulse becomes equal to said first reference voltage, three-phase generator means for deriving three-phase reference waves displaced 120° apart having edges synchronized to said first clock pulses and each of which has a period equal to the time interval required to generate a predetermined number of said first clock pulses, and means for controlling the fundamental output voltages of individual phases of said inverter bridge in accordance with said three-phase reference waves and including means for pulse width modulating conduction by said power transistor of said inverter bridge by variable width PWM pulses whose leading edges are established by said output pulses from said frequency switch, said pulse width modulation means regulating the termination of said PWM pulses as a function of said first control pulses, whereby the number of constant volt-second PWM pulses in each cycle of fundamental bridge inverter output voltage is controlled by the clock pulse train which is higher in frequency to thereby boost the terminal voltage applied by said bridge inverter to said motor at motor speeds below said breakpoint.

28. In a drive for a three-phase electric motor in accordance with claim 27 and including a second comparator for comparing said integrated volt/hertz value to a second reference voltage which is of lower magnitude than said first reference voltage and for deriving a second control pulse when the voltage of each said ramp pulse becomes equal to said second reference voltage, said pulse width modulation means regulating the termination of PWM pulses which occur during the first 30° and during the last 30° of the positive half cycle of the fundamental component of the output voltage of individual phases of said bridge inverter as a function of said second control pulses, whereby steps are provided in the output voltage from said bridge inverter and fifth and seventh harmonics are reduced in currents supplied to said motor.

29. A drive for a three-phase motor in accordance with claim 27 wherein said second oscillator means has slope adjusting means for selectively varying the rate at which the frequency of said second clock pulses changes in proportion to the magnitude of said speed signal to thereby regulate the slope of the bridge inverter output voltage versus frequency characteristic and the amount of voltage boost at low motor speeds.

30. A drive for a three-phase motor in accordance with claim 29 wherein said slope adjusting means includes a slope adjusting potentiometer to which said analog speed signal is applied and said second oscillator means has a timing capacitor and derives a second clock pulse when said timing capacitor is charged to a predetermined potential, and means controlled by the output signal from said slope adjusting potentiometer for regulating the magnitude of charging current to said timing capacitor.

31. A drive for a three-phase motor in accordance with claim 30 and including breakpoint adjusting means for selectively varying the charging current flowing into said timing capacitor independent of said slope adjusting potentiometer to thereby regulate both the breakpoint frequency at which the frequency-versus-speed signal charcteristic of said first and second oscillator means crosses and the predetermined motor speed below which motor terminal voltage is boosted.

32. A drive in accordance with claim 27 and including volt-second adjusting means for selectively varying the slope of said ramp signals to thereby regulate the volt/hertz level of said PWM pulses and the slope of the inverter output voltage versus frequency characteristic.

* * * * *